(12) United States Patent
Sasaki et al.

(10) Patent No.: US 7,435,480 B2
(45) Date of Patent: Oct. 14, 2008

(54) INFUSION SOLUTION BAG AND LAMINATED FILM THEREFOR

(75) Inventors: Hitoshi Sasaki, Kanagawa (JP); Tadayuki Mukai, Osaka (JP); Seiichi Okude, Mie (JP)

(73) Assignee: Nakamoto Packs Co., Ltd., Tennouji, Osaka (JP)

( * ) Notice: Subject to any disclaimer, the term of this patent is extended or adjusted under 35 U.S.C. 154(b) by 235 days.

(21) Appl. No.: 11/091,728

(22) Filed: Mar. 28, 2005

(65) Prior Publication Data

US 2005/0233099 A1    Oct. 20, 2005

(30) Foreign Application Priority Data

Mar. 29, 2004    (JP) .............................. 2004-095379

(51) Int. Cl.
 *B32B 9/04* (2006.01)
(52) U.S. Cl. .............. 428/411.1; 428/474.4; 428/475.5; 428/475.8; 428/476.1; 428/476.3; 428/476.9; 428/480; 428/483; 428/500; 428/515; 428/516; 428/518; 428/523; 428/688; 428/702
(58) Field of Classification Search ................ 428/35.2, 428/411.1, 474.4, 475.2, 475.5, 475.8, 476.1, 428/476.3, 476.9, 477.7, 480, 483, 500, 515, 428/516, 518, 523, 688, 689, 702
See application file for complete search history.

(56) References Cited

U.S. PATENT DOCUMENTS

| | | | |
|---|---|---|---|
| 4,548,605 A | 10/1985 | Iwamoto et al. | |
| 4,692,361 A | 9/1987 | Johnston et al. | |
| 5,348,794 A | * 9/1994 | Takahashi et al. | 428/213 |
| 5,407,751 A | * 4/1995 | Genske et al. | 428/516 |
| 5,529,833 A | * 6/1996 | Speer et al. | 428/215 |

FOREIGN PATENT DOCUMENTS

| | | |
|---|---|---|
| EP | 0 698 487 A1 | 2/1996 |
| JP | 2-46450 | 10/1990 |
| JP | 04-097750 | 3/1992 |
| JP | 04-282162 | 10/1992 |
| JP | 04-295368 | 10/1992 |
| JP | 07-251485 | 10/1995 |
| JP | 08-34729 | 3/1998 |
| JP | 3049280 | 3/1998 |
| JP | 2003-212767 | 7/2003 |

(Continued)

OTHER PUBLICATIONS

Entry for "polyethylene" from online version of Hawley's Condensed Chemical Dictionary, 14th Edition, 2002, John Wiley & Sons.*

(Continued)

*Primary Examiner*—Rena L. Dye
*Assistant Examiner*—Walter B Aughenbaugh
(74) *Attorney, Agent, or Firm*—Flynn, Thiel, Boutell & Tanis, P.C.

(57) ABSTRACT

An infusion solution bag is made of a particular laminated film which contains a heat-resistant resin layer, an oxygen gas barrier layer and a sealant layer laminated through an adhesive resin layer by thermal lamination, which is a solventless method.

6 Claims, 3 Drawing Sheets

FOREIGN PATENT DOCUMENTS

WO        WO 99/24086        5/1999

OTHER PUBLICATIONS

Entry for "acetate" from online version of Hawley's Condensed Chemical Dictionary, 14th Edition, 2002, John Wiley & Sons.*

Entry for "polyvinyl acetate" from online version of Hawley's Condensed Chemical Dictionary, 14th Edition, 2002, John Wiley & Sons.*

European Patent Office Search Report dated Jul. 5, 2005 (3 pages).

* cited by examiner (A)

(B)

INFUSION SOLUTION BAG AND LAMINATED FILM THEREFOR

FIELD OF THE INVENTION

This invention relates to an infusion solution bag made of a particular laminated film which comprises a heat-resistant resin layer, an oxygen gas barrier layer and a sealant layer laminated through an adhesive resin layer by thermal lamination which is a solventless method.

BACKGROUND OF THE INVENTION

Recently, for the purpose of preventing a nosocomial infection caused by contacting an infusion solution with intrahospital air, a closed system has been applied, where a glass bottle is substituted by a flexible plastic container, such as a polyvinyl chloride bag, so as not to develop a negative pressure with the discharge of an infusion solution. The plastic container is required to have a flexibility capable of following the discharge of the infusion solution, transparency allowing the observation of foreign materials and residual volume of infusion solution, thermal resistance capable of resisting sterilization, resistance to impacts so as not to be broken in physical distribution and handling, high oxygen gas barrier so that the infusion solution does not deteriorate, and adaptability to various laws, particularly Japanese Pharmacopoeia, 14th Revision, etc.

Conventional plastic containers for infusion solution are single layer containers in bag-shapes or blow-molding bottle-shapes and made of polyvinyl chloride, polyethylene, polypropylene or the like. The single layer containers are inferior as an oxygen gas barrier, although they satisfy other requirements.

It is possible to consider the lamination of an oxygen gas barrier layer for imparting oxygen gas barrier ability to the containers. In general, an oxygen gas barrier layer is laminated by dry lamination using a polyurethane adhesive. As a result, residual solvent and unreacted materials of the polyurethane adhesive elute into the infusion solution in the bag and it cannot pass the elution test in Japanese Pharmacopoeia, 14th Revision. A conventional curing agent for a polyurethane adhesive is toluene diisocyanate because of its fast reaction rate. However, toluene diisocyanate is prohibited by the FDA in the US because it converts to toluene diamine, which has carcinogenicity, during sterilization. Then, the curing agent is changed to an aliphatic isocyanate of which the reaction rate is slow, causing an increase in unreacted materials. Thus, plastic containers having an oxygen gas barrier layer have not been used as infusion solution bags.

As mentioned above, since single layer plastic containers are inferior in oxygen gas barrier ability, various techniques for preventing oxidation of the infusion solution have been developed.

JP2-46450B discloses the sterilization of an infusion solution, such as amino acids, fats, sugars or electrolytes, in an oxygen-free high pressure water vapor pressurized by an inert gas, in order to prevent deterioration by oxidation. After cooling, the infusion solution bag is vacuum-packaged or $N_2$ gas-packaged by a second package having a high oxygen gas barrier ability.

Amino acid infusion solutions and fat infusion solutions are liable to deteriorate by oxidation. Particularly, in the case of amino acid infusion solutions, a bisulfite or sulfite, such as $NaHSO_3{}^1$ or $Na_2SO_3$, is frequently added as an antioxidant in order to prevent coloring and production of insoluble indole compounds by the oxidation of tryphtophan, which is an essential amino acid. However, it is known that when an infusion solution containing sulfite ions is administered to a patient with hypersensitive diathesis or an atopic patient, the sulfite ions induce an allergic reaction, such as urticaria, bronchosposm or anaphylactic shock, from the patient. Accordingly, the presence of a sulfite is undesirable.

However, this technique has problems in the cost for the use of $N_2$ gas, restriction in working due to, unless packaging by a second package occurs immediately after sterilization, followed by cooling, deterioration proceeds, although the packaging by the second package is, in general, carried out as a transverse pillow-type, tunneling occurs at the meeting portion of a back seal with a transverse seal in this type to generate pinholes. When breakage or pinholes are generated in the second package during distribution or handling, the infusion solution is deteriorated by oxidation caused by entering air and extra cost is required for double packaging, and the use of sulfite ions, which is still required, nevertheless, is undesirable for the human body.

JP4-282162A discloses that a sterilized infusion solution in a plastic container is further packaged by a package having a high oxygen gas barrier ability, and an oxygen scavenger ("Age Less", Mitsubishi Chemicals) is placed therebetween.

JP4-295368A discloses that an infusion solution bag is first packaged with a package having a high oxygen gas barrier ability and an oxygen scavenger is placed therebetween. Then, the double package is sterilized and used for distribution as is. JP8-34729B discloses that, after sterilization, the oxygen gas barrier package and oxygen scavenger are changed by a second package having a high oxygen gas barrier ability and a new oxygen scavenger to prevent deterioration by oxidation.

However, the above techniques disclosed in JP4-282162A, JP4-295368A, JP8-34729B also have problems in transverse pillow-type packages, i.e. tunneling occurring at the meeting portion of a back seal with a transverse seal to generate pinholes. When breakage or pinholes are generated in the second package during distribution or handling, the infusion solution is deteriorated by oxidation caused by entering air and extra cost and labor are required for inserting an oxygen scavenger, and the use of sulfite ions, which is still required, nevertheless, is undesirable for the human body.

When plural infusion solutions, such as amino acids, fats, sugars or electrolytes, are administered simultaneously, they are suitably mixed on administration according to the condition of the disease. However, such a mixing in a hospital is troublesome and it is possible to cause contamination with bacteria and, accordingly, is unsanitary. Some techniques have been developed for mixing plural infusion solutions sanitarily by providing plural chambers divided by communicable barriers, each chamber containing a different infusion solution, and being allowed to communicate with each other on administration (Japanese Patent Nos. 2699212 and 3049280, JP2003-212767A).

However, the above techniques of providing plural chambers divided by communicable barriers have also the problems mentioned above.

SUMMARY OF THE INVENTION

An object of the invention is to provide an infusion solution bag which has a flexibility capable of following the discharge of the infusion solution, transparency, thermal resistance and resistance to impact, which are required of plastic containers for an infusion solution and, further, an oxygen gas barrier ability not requiring sulfite ions, which induce anaphylactic shock, and an adaptability to the elution test of Japanese Pharmacopoeia, 14th Revision.

The present inventors investigated eagerly in order to achieve the above object, and found that, when imparting a high oxygen gas barrier ability of 0.5 ml/m²·D·atm or less to an infusion solution bag, deterioration by oxidation of an amino acid infusion solution containing tryptophan and coloring do not occur without adding sulfite ions. They further found that, an infusion solution bag with such a high oxygen gas barrier ability as well as with the above performance for an infusion solution bag can be obtained by being formed of a laminated film composed of a heat-resistant resin layer, an oxygen gas barrier layer and a sealant layer, and the bag passes the elution test of Japanese Pharmacopoeia, 14th Revision by laminating them not by dry lamination using a polyurethane adhesive which leaves a residual solvent and uncured materials but by thermal lamination through an adhesive resin layer, to complete the invention.

Thus, the present invention provides an infusion solution bag made of a laminated film which comprises a heat-resistant resin layer, an oxygen gas barrier layer and a sealant layer as the innermost layer, wherein the heat-resistant resin layer or the oxygen gas barrier layer is laminated with the sealant layer through an adhesive resin layer by thermal lamination.

In the infusion solution bag of the invention, a high oxygen gas barrier ability is achieved by the oxygen gas barrier layer, i.e., the oxygen gas barrier of the infusion solution bag is made 0.5 ml/m₂·D·atm or less. As a result, sterilization is not required to be conducted in an oxygen-free atmosphere, and the infusion solution bag does not require $N_2$ gas substitution, an oxygen scavenger and double packaging. In the case of an amino acid infusion solution, coloring and production of insoluble indole compounds caused by the oxidation of tryptophan do not occur without adding sulfite ions, which induce anaphylactic shock.

Since the lamination is carried out not by dry lamination using a polyurethane adhesive, which leaves a residual solvent and unreacted materials, but by thermal lamination, so that residual solvent and unreacted materials of the adhesive do not elute into the infusion solution, and the infusion solution bag passes the elution test of Japanese Pharmacopoeia, 14th Revision.

Furthermore, the heat-resistant resin layer ensures the thermal resistance on making the infusion solution bag by heat sealing of the laminated film, and the sealant layer ensures flexibility and resistance to impact.

Figure 1:
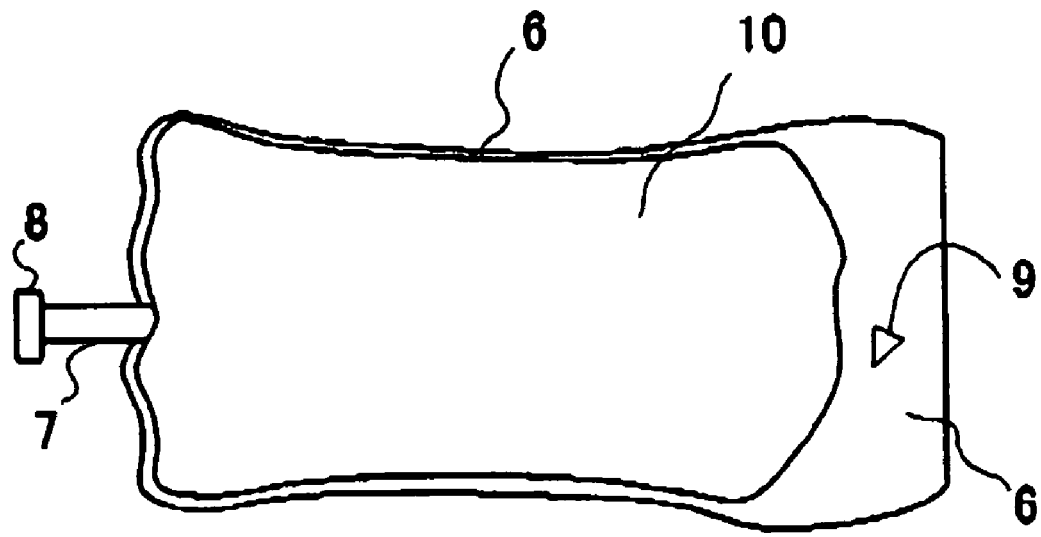
FIG. 1 is a plan view of an infusion solution bag applicable to the invention.
Figure 2:
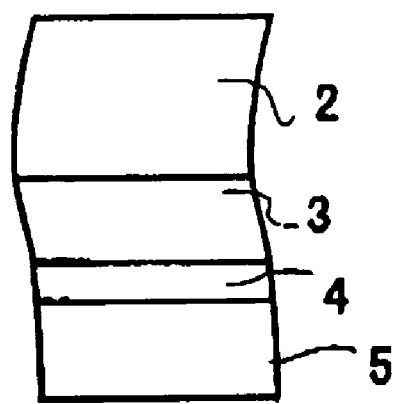
FIG. 2 is partial section of laminated films illustrating the layer construction which form an infusion solution bag embodying the invention.
Figure 2:
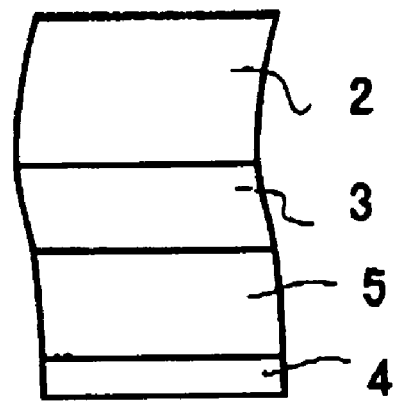

1 . . . Laminated film
2, 2a, 2b . . . Sealant layer
3 . . . Adhesive resin layer
4 . . . Oxygen gas barrier layer
5 . . . Heat-resistant resin layer
6 . . . Heat sealed portion
7 . . . Discharge port
8 . . . Closure
9 . . . Hanging hole
10 . . . Infusion solution
11 . . . First delivery roll
12, 13, 14 . . . Guide roll
21 . . . Second delivery roll
22, 23 . . . Guide roll
30 . . . Heating portion
31 . . . Infrared heater
32 . . . Concave reflector
33 . . . Cooling air nozzle
40 . . . Bonding means
41 . . . Nip roll
42 . . . Heating roll
43 . . . Back-up roll
51, 52 . . . Guide roll
61 . . . First delivery roll
62 . . . Second delivery roll
63 . . . Heating roll
64 . . . Nip roll
65 . . . Back-up roll
66 . . . Cooling roll
67 . . . Wind-up roll
68 . . . Guide roll
69 . . . Reversing roll

DETAILED DESCRIPTION OF THE INVENTION

Essential layers in the laminated film for the infusion solution bag of the invention are a heat-resistant resin layer, an oxygen gas barrier layer, an adhesive resin layer and a sealant layer.

The heat-resistant resin layer is incorporated for adding heat resistance to the laminated film, and preferred ones are polyester films, such as a polyethylene terephthalate (PET) film, and biaxially stretched polyamide films, such as a nylon-film. Particularly preferred are biaxially stretched nylon (O-NY) films because of their excellent resistance to piercing and tear strength, as well as heat resistance, which improve the physical distribution ability of the infusion solution bag. Since PET films and O-NY films are stiff, the thickness of the heat-resistant film layer is preferably thin so as not to degrade the flexibility of the infusion solution bag, and is preferably 7-25 μm, and 12 μm is particularly preferable, because of being mass-produced. In the case of an O-NY film, a preferable thickness is 10-25 μm, and 15 μm is particularly preferable, because of being mass-produced.

The oxygen gas barrier layer is incorporated for adding oxygen gas barrier ability to the laminated film and is transparent. Illustrative of the oxygen gas barrier layers are an aluminum oxide ($Al_2O_3$) membrane and a silicon oxide ($SiO_2$) membrane, which are formed by vacuum deposition, polyvinylidene chloride (PVDC) coating, PVDC film, polyacrylonitrile film, poly(metha)acrylic acid/sugar coating or the like.

The poly(metha) acrylic acid means polyacrylic acid, polymethacrylic acid, copolymers of acrylic acid and methacrylic acid, or mixtures thereof. They may be partially neutralized. Sugar has a general formula of $CnH_2nOn$, wherein n is an intergral number of 2-10, and illustrative of the sugars are glucose, mannose, galactose and xylose. The blending ratio of poly(metha) acrylic acid/sugar is 95/5 to 20/80 by weight. The poly(metha) acrylic acid/sugar coating composition is disclosed in JP 7-251485A, and is available from Kureha Chemical Ind. Co., Ltd Japan. The location of the oxygen gas barrier layer may be between the heat-resistant resin layer and the sealant layer, or at the outermost. For example, since the poly(metha) acrylic acid/sugar coating has heat resistance, the coating may be arranged as the outermost layer.

The sealant layer is incorporated for adding heat sealability to the laminated film when making an infusion solution bag, and located as the innermost layer which contacts with the infusion solution placed in the bag. Preferable sealant layers have a small elution into the infusion solution during sterilization and an excellent flexibility, and polyethylene (PE) film is preferable in these viewpoints. A particularly preferable sealant layer is a combination of a high density polyethylene (HDPE) layer having heat resistance and heat sealability and a linear low density polyethylene (LLDPE) layer having flexibility and impact resistance. Polypropylene (PP) film also has a heat resistance to the sterilization temperature. However, a PP film is undesirable, because it is stiffer than a PE film and elution is greater due to the great blending amount of additives, such as an antioxidant.

By the way, conventional low density polyethylene (LDPE) cannot resist a sterilization which is usually carried out at 121° C., nevertheless, the melting point of LDPE is 120° C. or less. However, by rendering the sealant layer of a multiple layer construction having at least a HDPE layer which is heat-resistant because of having a melting point of 130° C. or higher and a LLDPE layer which is excellent in flexibility and shock-absorbing ability, the sealant layer can resist sterilization and the elution amount is made small. Moreover, the sealant layer is excellent in flexibility and impact resistance. The multi-layer film having a HDPE layer and a LLDPE layer can be molded integrally by coextrusion. In order that the HDPE layer exhibits the above functions, it is located as the innermost layer of the infusion solution bag. The HDPE layer also functions as a heat sealing layer.

A preferable thickness of the HDPE layer is 3-50 μm. A thickness of less than 3 μm results in the rupture of the HDPE layer to expose the LLDPE layer. When the thickness exceeds 50 μm, it becomes difficult to follow the discharge of the infusion solution, because its flexibility is degraded. Since the HDPE layer is stiffer than the LLDPE layer, it is preferably thinner, because the thicker the HDPE layer is, the more the flexibility it loses as an infusion solution bag. Since it is also necessary to consider coextrusion ability, a particularly preferable thickness of the HDPE layer is 5-30 μm. A preferable thickness of the LLDPE layer is 30-300 μm, more preferably 50-200 μm in view of physical distribution strength and flexibility. A thickness of less than 30 μm results in bag rupture on handling or being dropped. When the thickness exceeds 300 μm, the flexibility degrades.

The adhesive resin layer is composed of either of an ethylene-unsaturated carboxylic acid anhydride-unsaturated carboxylic acid ester copolymer, ethylene-unsaturated carboxylic acid ester copolymer, or ethylene-vinyl ester copolymer, and a polyolefin having a melting point of 100° C. or more.

Illustrative of the unsaturated carboxylic acid anhydrides are maleic anhydride, itaconic anhydride, citraconic anhydride and dodecenyl succinic anhydride. Illustrative of the unsaturated carboxylic acid esters are methyl acrylate or methacrylate, ethyl acrylate or methacrylate, propyl acrylate or methacrylate, butyl acrylate or methacrylate, methyl fumarate, ethyl fumarate, propyl fumarate butyl fumarate, methyl maleate, ethyl maleate, propyl maleate and butyl maleate. Illustrative of vinyl esters are vinyl acetate and vinyl propionate. Two or more comonomers may be combined to produce the ethylene copolymers, and two or more ethylene copolymers may be blended.

A preferable melting point of the polyolefin is 100 to 160° C., more preferable 115 to 130° C. A suitable content of the polyolefin is not more than 70 wt. %, preferably not more than 50 wt. %. By blending the polyolefin, a heat resistance can be gained which is capable of resisting sterilization at 121° C. When the content of the polyolefin is beyond 70 wt. %, the adhesive strength becomes insufficient. Illustrative of the polyolefin having a melting point of 100° C. or more are low density polyethylene, linear low density polyethylene, medium density polyethylene and high density polyethylene.

Another resin composition applicable to the adhesive resin layer is composed of an ethylene copolymer containing an unsaturated carboxylic acid anhydride having a melting point lower than the sealant layer, a compound having plural hydroxyl groups and a metal salt. A suitable content of the compound having plural hydroxyl groups is 5-50 wt. % and a suitable metal salt content is 0.01-20 wt. %. Since a crosslinking reaction occurs in the resin composition, necessary heat resistance can be gained. Out of the above range is undesirable because a content of the compound having plural hydroxyl groups of less than 5 wt. % results in an insufficient crosslinking reaction and a content beyond 50 wt. % degrades the adhesiveness. A content of the metal salt of less than 0.01 wt. % cannot accelerate the crosslinking reaction rate and a content beyond 20 wt. % does not exhibit further acceleration of crosslinking and, therefore, is undesirable in view of cost and resin strength.

Illustrative of the compounds having plural hydroxyl groups are partially saponified ethylene-vinyl acetate copolymer, ethylene-vinyl alcohol copolymer, polyvinyl alcohol, ethylene glycol, glycerin, 1,4-butanediol, 1,6-hexanediol, 1,8-octanediol, 1,10-decanediol, trimethylol-methane, trimethylolethane, trimethylolpropane, pentaerythritol, diethylene glycol, triethylene glycol, tetraethylene, polyethylene glycol, diglycerin, triglycerin, etc.

Illustrative of the metal salts are the salts of saturated or unsaturated fatty acids, such as lithium laurate, sodium laurate, calcium laurate, aluminum laurate, potassium myristate, sodium myristate, aluminum myristate, sodium palmitate, zinc palmitate, magnesium palmitate, sodium stearate, potassium stearate, calcium stearate, zinc stearate, sodium oleate, ionomers, etc.

Various additives may be added to the adhesive resin layer.

The thickness of the adhesive resin layer is preferably 1-40 μm, more preferably 3-30 μm. It is difficult to interpose uniformly an adhesive resin layer of less than 1 μm in thickness and a thickness beyond 40 μm does not increase the adhesive strength but merely increases the cost.

Illustrative laminate constructions of the laminated film applicable to the invention are heat-resistant resin layer/oxygen gas barrier layer/adhesive resin layer/sealant layer, oxygen gas barrier layer/heat-resistant resin layer/adhesive resin layer/sealant layer, heat-resistant resin layer/adhesive resin layer/oxygen gas barrier layer/adhesive resin layer/sealant layer, oxygen gas barrier layer/adhesive resin layer/heat-resistant resin layer/adhesive resin layer/sealant layer, and various other resin layer(s) may further be incorporated.

The laminated film cannot be produced by coextrusion of all the layers, because of the great difference in melting points. Moreover, representative heat-resistant resin layers are stretched, and representative oxygen gas barrier layers are deposited membrane or coating layers. Thus, lamination is necessary for the production of the laminated film, and the laminated film is characterized by a lamination which is conducted by thermal lamination.

The thermal lamination is characterized by activating the surface of the adhesive resin layer by corona discharge, flame treatment or the like in the presence of oxygen to produce functional groups, e.g., a carboxyl group (—COOH) or an aldehyde group (—CHO), which contribute to adhesion, and then, pressing to laminate in a hot state. In the case of a corona discharge, the surface of the adhesive resin layer is almost in solid and, in the case of flame treatment, the surface is softened or melted.

In the thermal lamination, the adhesive resin layer is provided on a resin layer, especially a polyolefin layer, such as a heat-resistant resin layer or a sealant layer for the purpose of ensuring adhesive ability. The adhesive resin layer may be provided by extrusion using a T die or by coating using a die coater. When the layer to which the adhesive resin layer is provided is a coextruded HDPE/LLDPE layer, such as a sealant layer, the adhesive resin layer may be provided by triple layer coextrusion of an HDPE/LLDPE/adhesive resin layer. Since the adhesive resin layer is polyethylene-based, the adhesive resin layer can be strongly integrated with the LLDPE layer.

Then, the surface of the adhesive resin layer is treated with a corona discharge and, then, heated by medium wavelength (2.0-3.5 µm) infrared rays, followed by pressing to laminate, or treated with flame treatment, followed by pressing to laminate. Alternatively, the surface of the adhesive resin layer is treated with a corona discharge and, then, laminated using a heating roll.

When the thermal lamination is carried out between a mixed polymer coating of poly(metha) acrylic acid and sugar as the oxygen gas barrier layer and an HDPE/LLDPE/adhesive resin layer, since the mixed polymer coating has already been integrated with the heat-resistant resin layer, which is a PET film, O-NY film or the like, the surface of the adhesive resin layer of the HDPE/LLDPE/adhesive resin layer coextruded film is treated with a corona discharge, and then, heated by medium infrared rays, followed by pressing for laminating, or then pressed by a heating roll for lamination, to produce a heat-resistant resin layer/oxygen gas barrier layer/sealant layer or an oxygen gas barrier layer/heat-resistant resin layer/sealant layer.

The oxygen gas barrier ability of the laminated film for the infusion solution bag of the invention is preferably higher. However, when the oxygen gas barrier ability is 0.5 ml/m$^2$·D·atm, sulfite ions can be omitted, and there is no need for nitrogen gas pressurizing in the sterilization process and double packaging with $N_2$ substitution and an oxygen scavenger.

The infusion solution bag of the invention is made of the laminated film described above and has at least a discharge port of an infusion solution contained in the bag.

The discharge port is usually formed of a tube or pipe and the end is closed by a rubber plug or other means. When a medicine is added to the infusion solution, the medicine can be added through the discharge port. However, another port for adding may be provided.

A hanging hole is, in general, formed for hanging the infusion bag.

The bag is made by superposing two sheets of the laminated film by facing the sealant layers to each other and heat sealing the periphery to form a four-sided fin seal bag. The bag also can be made by folding one sheet of the laminated film and heat sealing free ends. In this case, the bag is a three-sided fin seal bag. The discharge port may be formed by heat sealing.

An infusion solution bag is illustrated in FIG. 1. This bag is made of the laminated film of the invention by heat sealing the periphery to form heat sealed portion 6. A discharge port 7 is provided at the center on the left side in the figure and the end is closed by a closure 8, such as a rubber plug. The heat sealed portion 6 is widened on the right side in the figure and a hanging hole 9 is punched for hanging the bag. An infusion solution 10 is charged therein.

Figure 3:
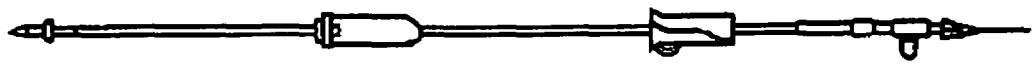
FIG. 3 is a tube which is used for injection of an infusion solution from the bag.

A tube for injecting an infusion solution is illustrated in FIG. 3.

The type of the infusion solution applicable to the infusion solution bag of the invention is not particularly restricted but includes various electrolyte infusion solutions, such as extracellular solution supplements, initiating solutions, supplements for dehydration, retainers and recoveries for post operation and various nutrient infusion solutions, such as homogeneity infusion solutions, fat emulsions, amino acid solutions, plasma extenders, etc.

The oxygen gas barrier ability was determined by measuring at 30° C. under 80% RH humidity conditions and using an oxygen permeability measuring apparatus ("OX-TRAN", tradename MODEL 2/21, manufactured by MOCON Co., Ltd.).

The elution test of the laminated film for the infusion solution bag was conducted according to the elution test in the test of the plastic containers for pharmaceutical preparations of Japanese Pharmacopoeia, 14th Revision. Each bag was charged with distilled water, heated at 121° C. for 1 hour, and then cooled to room temperature. Then, the maximum UV absorbance of the distilled water was measured in the ranges of 220-240 nm and 241-350 nm, respectively.

Subsequently, an apparatus for manufacturing the laminated film for infusion solution bag will be explained.

Figure 4:
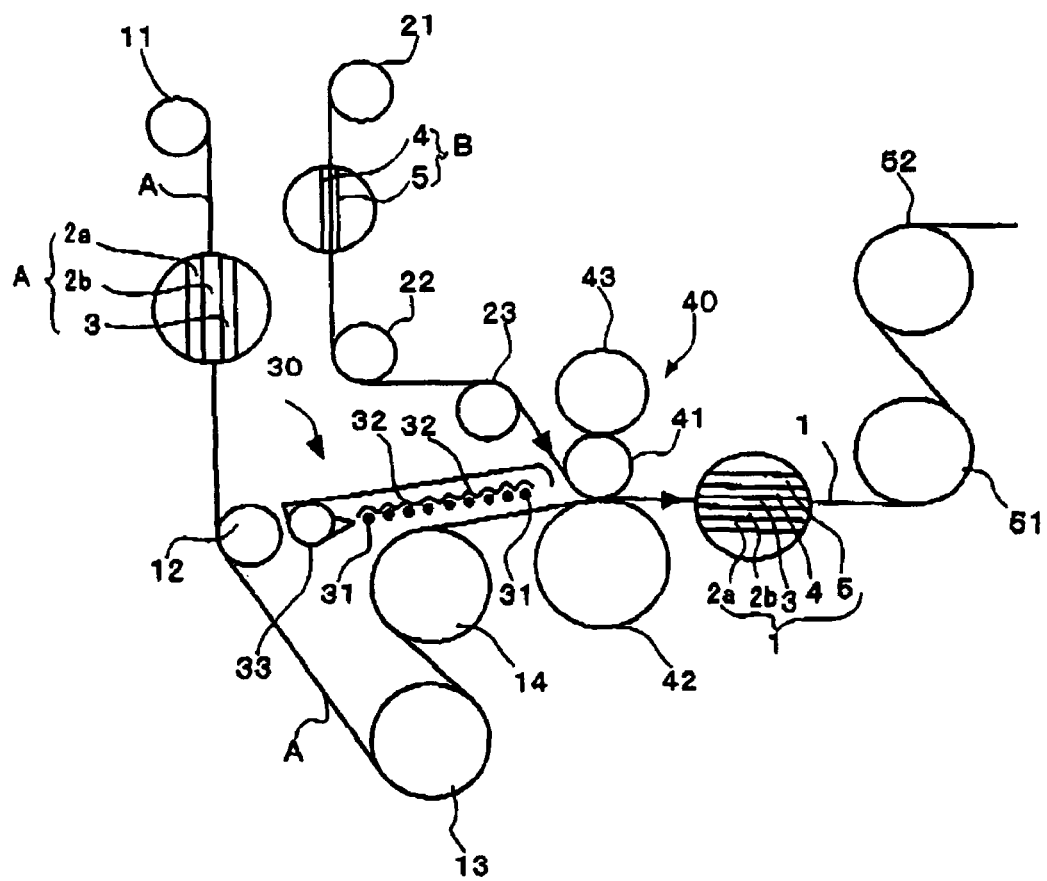
FIG. 4 is a schematic illustration of an apparatus for manufacturing a laminated film which constitutes an infusion solution bag of the invention.

FIG. 4 is a schematic illustration of an apparatus for manufacturing a laminated film for infusion solution bag of the invention. In the figure, 11 indicates a first delivery roll, and delivers a laminate A of a sealant layer formed by coextrusion of two layers 2a, 2b and an adhesive resin layer 3 laminated integrally with each other. 21 indicates a second delivery roll, and delivers a laminate B of an oxygen gas barrier layer 4 and a heat-resistant resin layer 5. 30 indicates a heating portion for heating the surface of the adhesive resin layer 3 of the above laminate A. 40 indicates the bonding means for bonding the oxygen gas barrier layer 4 of the laminate B to the adhesive resin layer 2 with pressure.

12, 13 and 14 indicate guide rolls which guide the laminate A to the bonding means 40 through the heating portion 30, and the guide roll 14 is located in the vicinity of the heating portion 30 so as to heat the laminate A at the heating potion 30. 22 and 23 are also guide rolls which guide the laminate B to the bonding means 40.

In the heating portion 30, a plurality of infrared heaters 31 are arranged in parallel perpendicular to the traveling direction of the laminate A. Each infrared heater 31 is provided with a concave reflector 32, and infrared rays are reflected by the concave reflector 32 and focused on the surface of the adhesive resin layer 3. The infrared heaters 31 are designed to be cut off automatically, when the apparatus is stopped caused by troubles or the like.

Cooling air nozzles 33 are provided in the vicinity of the infrared heater 31 arranged at the entrance of the heating portion 30. The cooling air nozzles 33 work, when the infrared heaters 31 are cut off, to blow cooling air onto the surface of the adhesive resin layer 3.

A nip roll 41 and heating roll 42 are provided at the bonding means 40, and they are arranged such that the laminate B meets the heated laminate A and press to bond them strongly while passing therebetween. 43 is a back-up roll for the nip roll 41. 51 and 52 are guide rolls for delivering the laminated film 1 formed by bonding the laminate B to the laminate A to the next process.

When manufacturing a thermal laminate using the above apparatus, the laminate A is delivered from the first delivery roll 11. The laminate A passes through the guide rolls 12, 13 and 14, successively, and is heated efficiently and sharply at the heating portion 30 by the infrared rays irradiated directly from the infrared heater 31 and reflected by the concave reflector 32. As a result, functional groups contributing to adhesion are induced efficiently on the adhesive resin layer 3.

On the other hand, the laminate B is delivered from the second delivery roll 21, and conveyed to the bonding means 40 through the guide rolls 22, 23. Then, the laminate B is met with the heated laminate A at the nip roll 41 of the bonding means 40 to be superimposed on each other, and pressed by the nip roll 41 and the heating roll 42 to be bonded. As a result, the laminate B is bonded strongly to the laminate A through the adhesive resin layer 3 to form the laminated film 1. The laminated film 1 is conveyed to the next process by the guide rolls 51, 52, etc.

Figure 5:
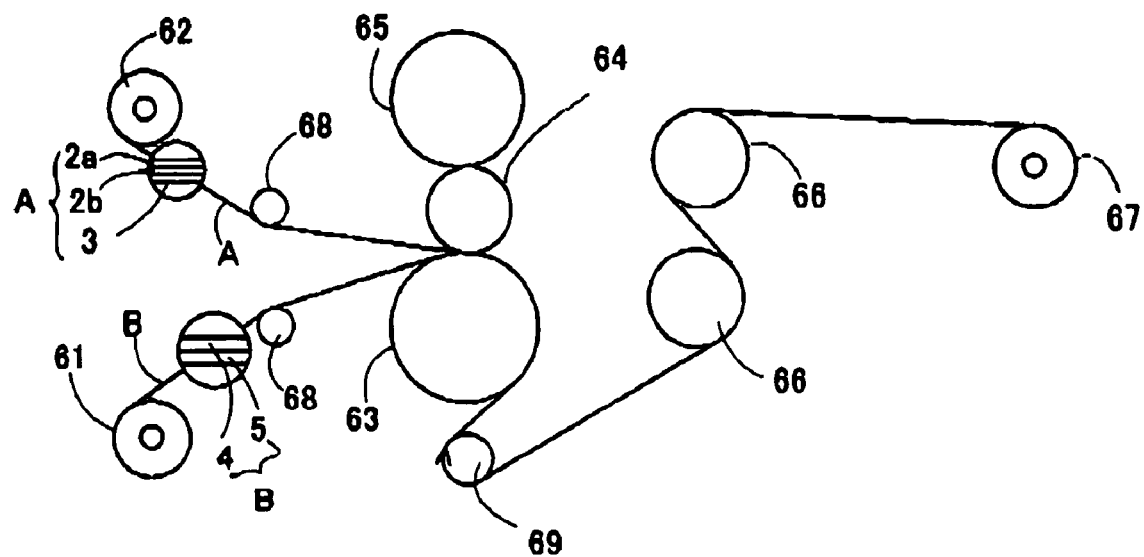
FIG. 5 is a schematic illustration of another apparatus for manufacturing a laminated film which constitutes another infusion solution bag of the invention.

Another apparatus for manufacturing a laminated film for an infusion solution bag is shown in FIG. 5. The apparatus comprises a first delivery roll 61, a second deliver roll 62, a heating roll 63, a nip roll 64, a back-up roll 65, cooling rolls 66, a wind-up roll 67, a reversing roll 69 and guide rolls 68.

A laminate B consisting of an oxygen gas barrier layer 4 and a heat-resistant resin layer 5 is delivered from the first delivery roll 61, and a laminate A consisting of a sealant layer formed by coextrusion of two layers 2a, 2b and an adhesive resin layer 3 is delivered from the second delivery roll 62. Both laminates A, B meet at the heating roll 63 which heats the laminates A, B stronger than the heating roll 42 in FIG. 4, and the adhesive resin layer 3 is bonded to the oxygen gas barrier layer 4 by the pressure of the nip roll 64. Then, the laminated film thus produced is reversed by the reversing roll 69, cooled by cooling rolls 66 and then is wound by the wind-up roll 67.

EXAMPLES

Example 1

Preparation of Laminate A

The sealant layer employed was a coextruded HDPE/LLDPE film ("LR-124", Showa Denko Plastic Products Co, Ltd.) 120 μm in thickness which resists a sterilization temperature of 121° C. On the LLDPE layer of the film, an adhesive resin composed of 93% ethylene-unsaturated carboxylic acid anhydride-unsaturated carboxylic acid ester copolymer and 7% high density polyethylene ("Rexpearl ET 184 M", Japan Polyolefins Co., Ltd.) was laminated by extrusion lamination at an extrusion temperature of 240° C. using a three layer coextruder composed of a main extruder (90 mm A) and two sub-extruders (50 mm φ) (manufactured by Modern Machinery Co., Ltd.), where the adhesive resin was charged into the main extruder, to produce a laminate A consisting of a HDPE layer 12 μm/LLDPE layer 108 μm/adhesive resin layer 20 μm. Then, the surface of the adhesive resin layer was treated with a corona discharge at 0.03 kW·min/m².

Preparation of Laminate B

A PET film ("Espet", Toyobo Co., Ltd.) 12 μm in thickness was used as the heat-resistant resin layer, and a mixed polymer coating 1 μm in thickness was provided on a surface of the PET film by coating poly(metha) acrylic acid-sugar as the oxygen gas barrier layer to produce a laminate B.

Thermal Lamination

The lamination of the laminate A with the laminate B was carried out using the apparatus shown in FIG. 4.

In the above apparatus, the infrared heaters 31 employed were nine medium infrared heaters each with 3.2 KW 1,300 mm in length (Heraeus K.K.). The guide rolls 13 and 14 were heated at 30° C., and the heating roll 42 was heated at 90° C. The laminate A was delivered from the first delivery roll 11, and the laminate B was delivered from the second delivery roll 21, respectively. The delivery speed of the laminate A and the laminate B, i.e. the manufacturing speed of the laminated film 1 was 50 m/min.

The surface temperature of the adhesive resin layer 3 of the laminate A was at 600-700° C. upon being heated by the infrared heaters 31, which was measured by a radiation thermometer. The nip pressure at the nip roll 41 was 24 kg-cm as a linear pressure.

Thus, a laminated film for an infusion solution bag was produced having a layer constitution of a PET film layer 12 μm/mixed coating layer of poly(metha) acrylic acid·sugar 1 μm/adhesive resin layer 20 μm/LLDPE layer 108 μm/HDPE layer 12 μm.

Preparation of Infusion Solution Bag

Two sheets of the laminated film were superimposed while locating the HDPE layer as the innermost layer and three sides were heat-sealed to form a bag for an infusion solution having a size of 14 cm×18 cm.

UV Absorption Test

The bag was charged with 250 ml distilled water (ratio of liquid volume for extraction to area of material was 250 ml/14×18×2 cm=0.5 ml/cm²), the opening was heat-sealed and heated at 121° C. for 1 hour, according to the elution test in Japanese Pharmacopoeia, 14th Revision. After cooling, the UV spectra of the content liquid was measured by a spectrophotometer ("Hitachi Ratiobeam Spectophotometer U-1100", Hitachi Science Systems Co., Ltd.), and the UV absorbances (-log T) obtained are shown in Table 1.

TABLE 1

| | UV Absorbance (−log T) | |
|---|---|---|
| | 220-240 nm | 241-350 nm |
| Jap. Pharm. 14th Rev. Standard | ≦0.08 | ≦0.05 |
| Example 1 | 0.019 | 0.005 |

As shown in Table 1, the UV absorbances obtained in Example 1 are considerably smaller than the standard values of Japanese Pharmacopoeia, 14th Revision.

Coloring Test, Oxygen Gas Barrier Test

Distilled water for injection was boiled to expel dissolved oxygen and cooled to about 50° C. The amino acids shown in Table 2 were dissolved in about 800 ml of the above distilled water for injection with heating. No sulfites were added.

TABLE 2

| | |
|---|---|
| L-Tryptophan | 2.6 g |
| L-Leucine | 11.3 g |
| L-Isoleucine | 7.2 g |
| L-Valine | 8.2 g |
| L-Lysine acetate | 11.6 g |
| L-Threonine | 5.2 g |

TABLE 2-continued

| | |
|---|---|
| L-Methionine | 11.3 g |
| L-Phenylalanine | 11.3 g |
| L-Histidine | 5.6 g |

After cooling, the pH of the amino acid solution was adjusted to 6.8 and the total volume was made to be 1000 ml by adding the above distilled water for injection. Then, the solution was filtered by a millipore filter (pore size: 0.22 µm) to obtain an amino acid infusion solution.

Subsequently, the bag (14 cm×18 cm) made by the laminated film of Example 1 was charged with 250 ml of the amino acid infusion solution, air in the space portion was expelled by blowing nitrogen and the bag sealed by heat sealing. The infusion solution bag containing the amino acid infusion solution was sterilized by heating at 121° C. for 20 minutes. The appearance and colored degree were evaluated as to before and after the sterilization and after storing at 60° C. for 2 months. The appearance was evaluated by visual observation and the colored degree was determined by measuring transmittance at 430 nm in a cell length of 1 cm using a spectrophotometer ("Hitachi Ratiobeam Spectrophotometer U-1100", Hitachi Science Systems Co., Ltd.). The results are shown in Table 3.

TABLE 3

| | Before Sterilization | After Sterilization | After 2 months at 60° C. |
|---|---|---|---|
| Appearance | Colorless Transparent | Colorless Transparent | Colorless Transparent |
| Colored Degree (Transmittance) | 99.3% | 98.3% | 97.2% |

The oxygen gas barrier ability of the infusion solution bag was measured after sterilization, from which the amino acid infusion solution was taken out, and shown in Table 4.

TABLE 4

| Oxygen gas barrier ability: | 0.2 ml/m² · D · atm |
|---|---|

The oxygen gas barrier ability was measured at 30° C. under 80% RH conditions by using an oxygen permeability measuring apparatus ("OX-TRAN", tradename, MODEL 2/21, manufactured by MOCON Co., Ltd.).

As shown in Tables 3 and 4, when the oxygen gas barrier ability is not more than 0.5 ml/m²·D·atm, coloring does not occur, even after sterilization and after storing at 60° C. for 2 months. Accordingly, sulfites, which induce anaphylactic shock, can be omitted.

Example 2

Preparation of Laminate A

A three layer coextruder composed of a main extruder (90 mmφ) and two sub-extruders (50 mmφ)(manufactured by Modern Machinery Co, Ltd.) was used. A LLDPE resin "Harmorex LL NC 5T4R", Japan Polyolefins Co., Ltd.) was charged into the main extruder, a HDPE resin ("Novatec HD-LY20", Japan Polychem Corp.) was charged into one of the subextruders and an adhesive resin composed of 93% ethylene-unsaturated carboxylic acid anhydride-unsaturated carboxylic acid ester copolymer and 7% high density polyethylene ("Rexpearl ET-184 M", Japan Polyolefins Co., Ltd.) was charged into the other sub-extruder. Then, coextrusion was carried out at 260° C. to produce a laminate A consisting of HDPE layer 10 µm/LLDPE layer 90 µm/adhesive resin layer 15 µm. Then, the surface of the adhesive resin layer was treated with a corona discharge at 0.03 kW·min/m².

Preparation of Laminate B

An O-NY film ("Harden Film N1130", Toyobo Co., Ltd.) 15 µm in thickness was used as the heat-resistant resin layer, and a mixed polymer coating 1 µm in thickness was provided on a surface of the O-NY film by coating poly(metha) acrylic acid-sugar as the oxygen gas barrier layer to produce a laminate B.

Thermal Lamination

The lamination of the laminate A with the laminate B was carried out using the apparatus shown in FIG. 5. The laminating conditions were as follows:

Heating roll temperature: 120° C.
Nip pressure: 24 kg·cm
Manufacturing speed: 30 m/min
Cooling roll temperature: 25° C.

Thus, a laminated film for an infusion solution bag was produced having a layer constitution of O-NY film layer 15 µm/mixed polymer coating layer of poly(metha)acrylic acid·sugar 1 µm/adhesive resin layer 15 µm/LLDPE layer 90 µm/HDPE layer 10 µm.

Preparation of Infusion Solution Bag

Using the laminated film, a bag for an infusion solution was prepared similar to Example 1.

UV Absorption Test

The UV absorbance was measured similar to Example 1 and the results are shown in Table 5.

TABLE 5

| | UV Absorbance (−log T) | |
|---|---|---|
| | 220-240 nm | 241-350 nm |
| Jap. Pharm. 14th Rev. Standard | ≦0.08 | ≦0.05 |
| Example 2 | 0.009 | 0.004 |

As shown in Table 5, the UV absorbances obtained in Example 2 are considerably smaller than the standard values of Japanese Pharmacopoeia, 14th Revision.

Coloring Test, Oxygen Gas Barrier Test

The coloring test and oxygen gas barrier test were carried out similar to Example 1 and the results are shown in Tables 6 and 7.

TABLE 6

| | Before Sterilization | After Sterilization | After 2 months at 60° C. |
|---|---|---|---|
| Appearance | Colorless Transparent | Colorless Transparent | Colorless Transparent |
| Colored Degree (Transmittance) | 99.3% | 98.1% | 97.0% |

TABLE 7

| Oxygen gas barrier ability: | 0.3 ml/m² · D · atm |
|---|---|

As shown in Tables 6 and 7, when the oxygen gas barrier ability is not more than 0.5 ml/m²·D·atm, coloring does not occur, even after sterilization and after storing at 60° C. for 2 months. Accordingly, sulfites, which induce anaphylactic shock, can be omitted.

The invention claimed is:

1. A laminated film for an infusion solution bag which comprises a heat-resistant resin layer composed of a polyester film or a biaxially stretched polyamide film, an oxygen gas barrier layer formed by a membrane of one of aluminum oxide and silicon oxide or a coating layer of polyvinylidene chloride and poly(metha)acrylic acid/sugar, an adhesive layer composed of a mixture of an ethylene-unsaturated carboxylic acid anhydride-unsaturated carboxylic acid ester copolymer, an ethylene-unsaturated carboxylic acid ester copolymer or an ethylenevinyl ester copolymer and a polyolefin having a melting point of at least 100° C. and a sealant layer formed from a combination of a high density polyethylene layer and a linear low density polyethylene layer, one of the heat-resistant resin layer and the oxygen gas barrier layer is the outermost layer, the sealant layer is the innermost layer, one of the heat-resistant resin layer and the oxygen gas barrier layer is laminated with the sealant layer through the adhesive resin layer by thermal lamination and the high density polyethylene layer is the innermost layer of the sealant layer.

2. The laminated film of claim 1, which consists essentially of the heat-resistant resin layer, the oxygen gas barrier layer, the adhesive resin layer and the sealant layer.

3. The laminated film of claim 1, which has an oxygen gas barrier ability of no more than 0.5 ml/m²·D·atm.

4. The laminated film of claim 1, wherein the thermal lamination is carried out by activating the surface of the adhesive resin layer in the presence of oxygen to produce functional groups which contribute to adhesion and then conducting pressing to laminate in a hot state.

5. The laminated film of claim 4, wherein the surface is activated by corona discharge or flame discharge.

6. The laminated film of claim 1, wherein the adhesive resin layer is interposed between and in direct contact with the sealant layer and one of the heat-resistant resin layer and the oxygen gas barrier layer.

* * * * *